United States Patent [19]

Nagaoka et al.

[11] Patent Number: 4,877,855
[45] Date of Patent: Oct. 31, 1989

[54] SILOXANE-AMIDE BLOCK COPOLYMER AND PROCESS FOR PRODUCING THE SAME

[75] Inventors: Hisayuki Nagaoka; Michio Zenbayashi; Chiyuki Shimizu, all of Gunma, Japan

[73] Assignee: Toshiba Silicone Co., Ltd., Tokyo, Japan

[21] Appl. No.: 228,413

[22] Filed: Aug. 5, 1988

[30] Foreign Application Priority Data

Aug. 7, 1987 [JP] Japan .................................. 62-197504

[51] Int. Cl.$^4$ .............................................. C08G 77/04
[52] U.S. Cl. ......................................... 528/26; 528/28; 528/18; 525/431; 556/419
[58] Field of Search ............................ 528/26, 28, 18; 525/431; 556/419

[56] References Cited

U.S. PATENT DOCUMENTS

| | | | |
|---|---|---|---|
| 4,278,786 | 7/1981 | Nanaumi et al. | 528/179 |
| 4,668,754 | 5/1987 | Policastro et al. | 528/26 |
| 4,754,016 | 6/1988 | Ai et al. | 528/26 |

*Primary Examiner*—Melvyn I. Marquis
*Attorney, Agent, or Firm*—Sughrue, Mion, Zinn, Macpeak & Seas

[57] ABSTRACT

A siloxane-amide block copolymer represented by formula (I):

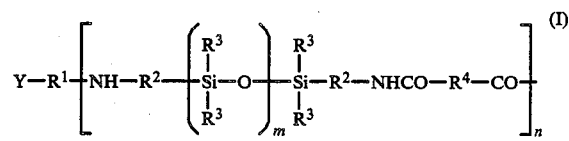

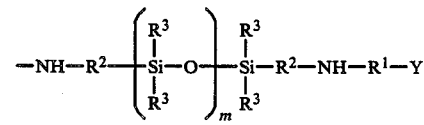

wherein the symbols are as defined in the specification, is disclosed. The polymer of formula (I) is produced by reacting a polycondensate of a diaminosiloxane and a dicarboxylic acid dihalide with an epoxysilane to induce ring-opening addition reaction between the terminal amino groups of the polymer and the epoxy group of the epoxysilane. The siloxane-amide block copolymer exhibits excellent processability and reactive curability due to the hydrolyzable silyl groups at the both terminals.

6 Claims, No Drawings

SILOXANE-AMIDE BLOCK COPOLYMER AND PROCESS FOR PRODUCING THE SAME

FIELD OF THE INVENTION

This invention relates to a novel siloxane-amide block copolymer and a process for producing the same. More particularly, it relates to a siloxane-amide block copolymer having excellent processability and excellent reactive curability attributed to its terminal hydrolyzable silyl groups and to a process for producing the same.

BACKGROUND OF THE INVENTION

Polyamide is known to have excellent mechanical properties combined with satisfactory heat resistance and abrasion resistance. Taking full advantage of these performance properties, it is utilized as electrical insulating materials, various molding materials, coating materials, impregnating materials, and the like in a wide application, such as domestic and industrial equipments or devices, electronic industrial parts, automobile parts, gears, etc.

Inspite of the excellent characteristics, polyamide, particularly aromatic polyamide, has extremely poor processability. Namely, the polyamide is hardly melted; or, if melted, requires a very high temperature for melting; or organic solvents in which it is soluble are limited to a very narrow range. As a result, great difficulties arise in processing polyamide.

In order to eliminate this disadvantage, it has been proposed to polycondensate an aromatic etherdiamine and an aromatic dicarboxylic acid or a reactive derivative thereof to produce an aromatic polyetheramide polymer having excellent processability, as disclosed in U.S. Pat. No. 4,278,786.

The above-described aromatic polyetheramide polymer is characterized not only by its excellent processability but by excellent heat resistance. However, since this polymer is thermoplastic, though excellent in heat resistance, it undergoes melting and deformation at temperatures over the range of allowable high temperature use.

SUMMARY OF THE INVENTION

One object of this invention is to overcome the above-described disadvantages associated with the conventional aromatic polyetheramide polymer and to provide a siloxane-amide block copolymer excellent in processability as well as reactive curability.

Another object of this invention is to provide a process for producing the above-described siloxane-amide block copolymer.

As a result of extensive investigations, it has now been found that a siloxane-amide block copolymer having excellent processability and reactive curability attributed to its terminal hydrolyzable silyl groups, the block copolymer being represented by formula (I):

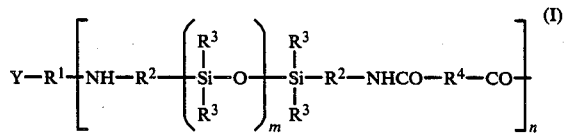

-continued

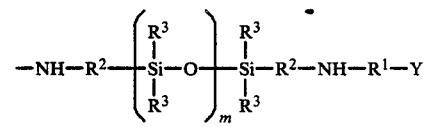

wherein Y represents an organosilyl group containing a hydrolyzable group represented by formula $-SiR^5_aX_{3-a}$; $R^1$ represents a divalent group selected from the group consisting of

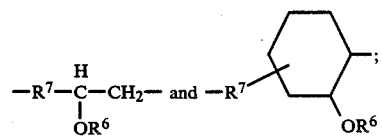

$R^2$ represents a substituted or unsubstituted divalent hydrocarbon group; $R^3$ represents a substituted or unsubstituted monovalent hydrocarbon group; $R^4$ represents a substituted or unsubstituted divalent aromatic hydrocarbon group; $R^5$ represents a substituted or unsubstituted monovalent hydrocarbon group; $R^6$ represents a hydrogen arom, the same substituted or unsubstituted monovalent hydrocarbon group as represented by $R^3$ or an organosilyl group represented by formula $-SiR^8_bX_{3-b}$; $R^7$ represents a substituted or unsubstituted divalent hydrocarbon group containing up to 8 carbon atoms which may contain therein an ether linkage containing an oxygen or sulfur atom; $R^8$ represents the same monovalent group as represented by $R^3$; X represents a hydrolyzable group or hydroxyl group bonded to the silicon atom; a represents 0 or an integer of 1 or 2; b represents 0 or an integer of from 1 to 3; and m and n each represents a number of 1 or more, can be obtained by mixing a diaminosiloxane represented by formula (II):

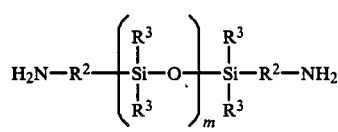

wherein $R^2$, $R^3$ and m are as defined above, and a dicarboxylic acid dihalide represented by formula (III):

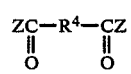

wherein $R^4$ is as defined above; and Z represents a halogen atom, under stirring to obtain a polycondensate and adding an epoxysilane represented by formula (IV):

wherein $R^5$, X, and a are as defined above; and $R^9$ represents an epoxy group-containing organic group represented by formula

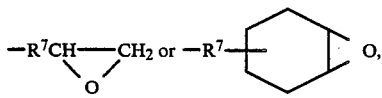

wherein $R^7$ is as defined above, to the polycondensate to thereby induce ring-opening addition reaction between the terminal amino groups of the polycondensate and the epoxy group in the epoxysilane. The present invention has been completed based on this finding.

That is, the present invention relates to a siloxane-amide block copolymer represented by formula (I) having excellent characteristics and to a process for producing the same.

DETAILED DESCRIPTION OF THE INVENTION

The siloxane-amide block copolymer represented by formula (I) can be produced from the diaminosiloxane represented by formula (II), the dicarboxylic acid dihalide represented by formula (III), and the epoxysilane represented by formula (IV).

In formula (II), $R^2$ represents a substituted or unsubstituted divalent hydrocarbon group and includes a trimethylene group, a tetramethylene group, a pentamethylene group, a phenylene group, a tolylene group, a dimethylphenylene group, etc. $R^3$ represents a substituted or unsubstituted monovalent hydrocarbon group and includes methyl, ethyl, propyl, butyl, pentyl, hexyl, phenyl, tolyl, xylyl, halophenyl, halotolyl, cyanoethyl, and 3,3,3-trifluoropropyl groups. m is a number of 1 or more. Specific examples of the diaminosiloxane of formula (II) are shown below.

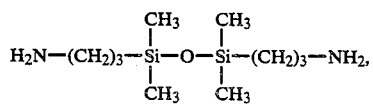

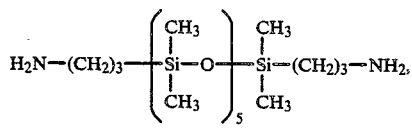

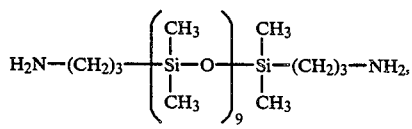

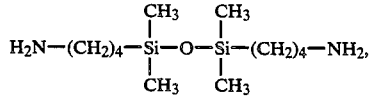

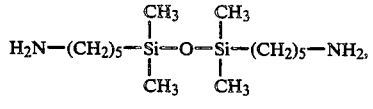

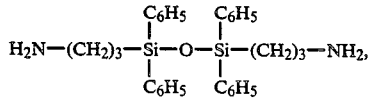

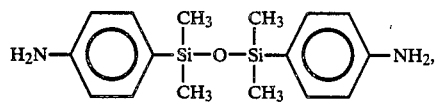

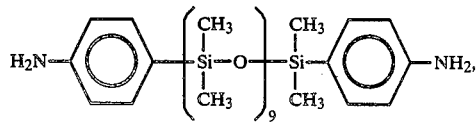

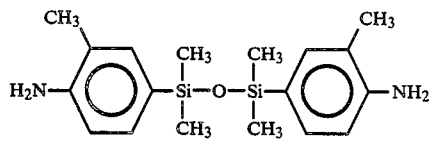

These compounds may be used either individually or in combination of two or more thereof.

In formula (III), the substituted or unsubstituted divalent aromatic hydrocarbon group as represented by $R^4$ includes phenylene, tolylene, dimethylphenylene, halogenated phenylene, naphthalene, diphenyl ether, diphenylmethane, diphenylsulfone, and diphenyl sulfide groups. The halogen atom as represented by Z includes chlorine, fluorine, and bromine atoms. Specific examples of the dicarboxylic acid dihalide of formula (III) include a dichloride, difluoride or dibromide of terephthalic acid, isophthalic acid, 1,4-naphthalenedicarboxylic acid, 1,5-naphthalenedicarboxylic acid, 2,6-naphthalenedicarboxylic acid, 4,4'-diphenylmethanedicarboxylic acid, 3,3'-diphenyletherdicarboxylic acid, 4,4'-diphenyletherdicarboxylic acid, 4,4'-diphenylmethanedicarboxylic acid, 3,3'-diphenylmethanedicarboxylic acid, 4,4'-diphenylsulfide dicarboxylic acid, 3,3'-diphenylsulfide dicarboxylic acid, and so on. These compounds may be used either individually or in combination of two or more thereof.

In formula (IV), the epoxy-containing group as represented by $R^9$ includes γ-glycidoxypropyl and β-(3,4-epoxycyclohexyl)ethyl groups. The monovalent hydrocarbon group as represented by $R^5$ includes methyl, ethyl, propyl, butyl, vinyl, allyl, phenyl, and halophenyl groups. The hydrolyzable group as represented by X includes methoxy, ethoxy, propoxy, β-methoxyethoxy, isopropenyloxy, diethylaminoxy, and acetoxy groups. Specific exampels of the epoxysilane of formula (IV) are γ-glycidoxypropyltrimethoxysilane, γ-glycidoxypropylmethyldiethoxysilane, γ-glycidoxypropyldimethylethoxysilane, γ-glycidoxypropyltris(methylethylketoxime)silane, γ-glycidoxypropyltriacetoxysilane, β-(3,4-epoxycyclohexyl)ethyltrimethoxysilane, β-(3,4-epoxycyclohexyl)ethylmethyldimethoxysilane, β-(3,4-epoxycyclohexyl)ethyltris(methylethylketoxime)silane, and β-(3,4-epoxycyclohexyl)ethyltriacetoxysilane.

In the production of the siloxane-amide block copolymer represented by formula (I), the diaminosiloxane of formula (II) and the dicarboxylic acid dihalide of formula (III) are subjected to polycondensation. After the reaction, the reaction mixture is washed with water and dried to obtain a polymer. To the resulting polymer is added the epoxysilane of formula (IV) to thereby induce ring-opening addition reaction between the amino group at both terminals of the polymer and the epoxy group in the epoxysilane.

In carrying out the polycondensation, it is required, taking the subsequent reaction with the epoxysilane into consideration, that the diaminosiloxane be charged in a slight excess over the dicarboxylic acid dihalide. Specifically, the amount of the diaminosiloxane to be charged ranges from 1.005 to 2.0 moles, preferably from 1.01 to 1.5 moles, per mole of the dicarboxylic acid dihalide. If it is less than 1.005 mole, the resulting copolymer does not always contain an amino group at both terminals thereof. If it exceeds 2.0 moles, the copolymer finds difficulty in growing to have a molecular weight enough to exhibit satisfactory physical properties.

Upon ring-opening addition reaction ascribed to the epoxy group of the epoxysilane, a hydroxyl group is formed at both terminals of the copolymer as a side chain. If necessary, the hydroxyl groups thus formed may be modified with, for example, a silylating agent, e.g., $[(CH_3)_3Si]_2NH$, $(CH_3)_3SiN(C_2H_5)_2$, $(CH_3)_3SiCl$,

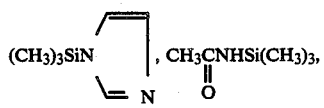

$[(CH_3)_3SiNH]_2C=O$, and

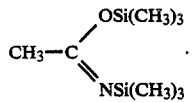

Characteristic properties of the siloxane-amide block copolymer produced by the process of this invention are subject to wide variations depending on the kind of the diaminosiloxane, the length of the siloxane unit, the kinds and amounts of the dicarboxylic acid dihalide and epoxysilane, and the like. It is, however, preferred for the resulting siloxane-amide block copolymer to have sufficiently an excellent processability and also excellent characteristics, such as excellent mechanical properties and heat resistance, which are the characteristics of the polyamide.

The polycondensation between the diaminosiloxane and the dicarboxylic acid dihalide is carried out at a temperature ranging from 10° C. to 100° C. The use of an organic or inorganic solvent and a base as a catalyst is preferable to facilitate the reaction. The organic solvent includes toluene, xylene, chlorobenzene, dichlorobenzene, hexane, octane, diethyl ketone, dibutyl ketone, cyclohexanone, chloroform, 1,2-dichloroethane, 1,1,2,2-tetrachloroethane, N,N-dimethylformamide, N,N-dimethylacetamide, N-methyl-2-pyrrolidone, and mixtures thereof. The inorganic solvent includes an aqueous solution of sodium hydroxide or sodium carbonate. The base catalyst includes, for example, triethylamine and diisopropylmethylamine.

The reaction temperature for the ring-opening addition of the epoxysilane to the amino terminals preferably ranges from 50° C. to 120° C.

The thus produced siloxane-amide block copolymer is excellent in processability and can be cured on hydrolysis of the terminal hydrolyzable silyl groups with moisture in air at room temperature.

The conventional polyamide resins, though excellent in mechanical and chemical properties, show insufficient processability. To the contrary, the siloxane-amide block copolymer according to the present invention exhibits markedly improved processability. In addition, it is a liquid or resinous engineering plastic exhibiting reactive curability at room temperature. Hence, the present invention is of high industrial value because it achieves broadening of application of polyamide resins, raising the limitation due to poor processability of the conventional polyamide resins.

The present invention is now illustrated in greater detail with reference to the following Examples, but it should be understood that the present invention is not limited thereto. In these examples, all the parts are by weight unless otherwise indicated.

EXAMPLE 1

To 38.3 parts of dehydrated xylene were added 40.3 parts (0.074 mol.) of diaminopropylsiloxane of formula:

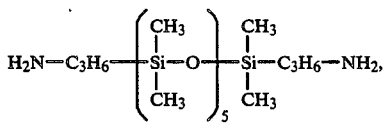

22.5 parts of triethylamine, and 2.8 parts of N-methyl-2-pyrrolidone, and the mixture was stirred in a nitrogen atmosphere. Then, 13.7 parts (0.067 mol.) of terephthalic dichloride was dissolved in 38.3 parts of dehydrated xylene containing 2.8 parts of N-methyl-2-pyrrolidone, and the resulting solution was added dropwise to the above-prepared mixture under stirring at room temperature. After the dropwise addition, the stirring was continued for an additional one hour at room temperature and then for 8 hours at 80° C. to effect polymerization. The resulting polymer was washed with water several times and dried under reduced pressure.

The polymer was identified to be a siloxane-amide block copolymer having formula shown below by gel-permeation chromatography (GPC), $^1$H-NMR spectrum, and infrared absorption spectrum:

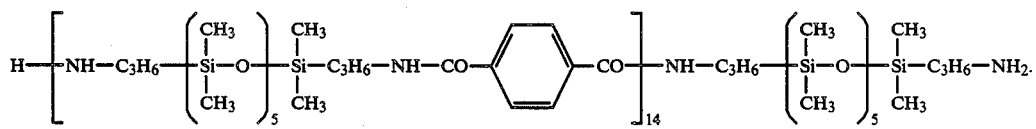

To 51.0 parts of the polymer produced was added 0.20 part of ammonium chloride. Then, 2.84 parts (0.012 mol.) of γ-glycidoxypropyltrimethoxysilane was added dropwise to the mixture while stirring in a nitrogen atmosphere. To the mixture was further added dropwise 0.98 part ($6.1 \times 10^{-3}$ mol.) of hexamethyldisilazane. After completion of the dropwise addition, the stirring was further continued for an additional time of 2 hour under the same condition to effect reaction. After completion of the reaction, the excess silane and silazane, etc. were removed at 100° C. under reduced pressure to obtain a reddish orange transparent product. This product was identified as the expected siloxane-amide block copolymer represented by formula shown below by its infrared absorption spectrum;

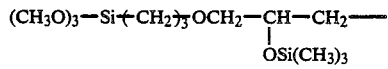

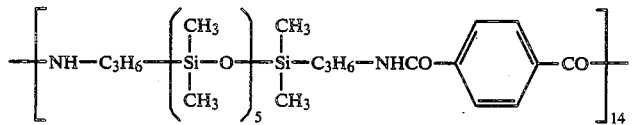

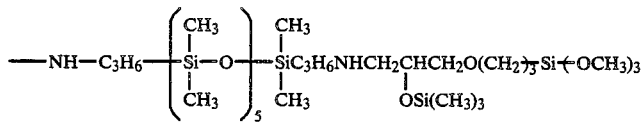

The copolymer had a thermal decomposition temperature of 385° C., proving satisfactorily resistant to heat. Other characteristics properties of the resulting copolymer are shown in Table 1 below.

EXAMPLE 2

To 58.0 parts of dehydrated xylene were added 79.8 parts (0.095 mol.) of diaminopropylsiloxane of formula:

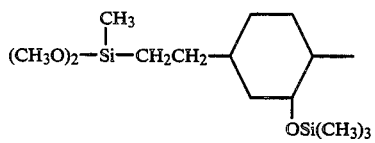

and 26.5 parts of triethylamine, and the mixture was stirred in a nitrogen atmosphere. Then, 16.0 parts (0.079 mol.) of isophthalic dichloride was dissolved in 58.0 parts of dehydrated xylene containing 1.6 parts of N-methyl-2-pyrrolidone, and the resulting solution was added dropwise to the above-prepared mixture under stirring at room temperature. After the dropwise addition, the stirring was continued for an additional one hour at room temperature and then for 1 hour at 80° C. to effect polymerization. The resulting polymer was washed with water several times and dried under reduced pressure.

The polymer was identified to be a siloxane-amide block copolymer having formula shown below by GPC, $^1$H-NMR spectrum, and infrared absorption spectrum:

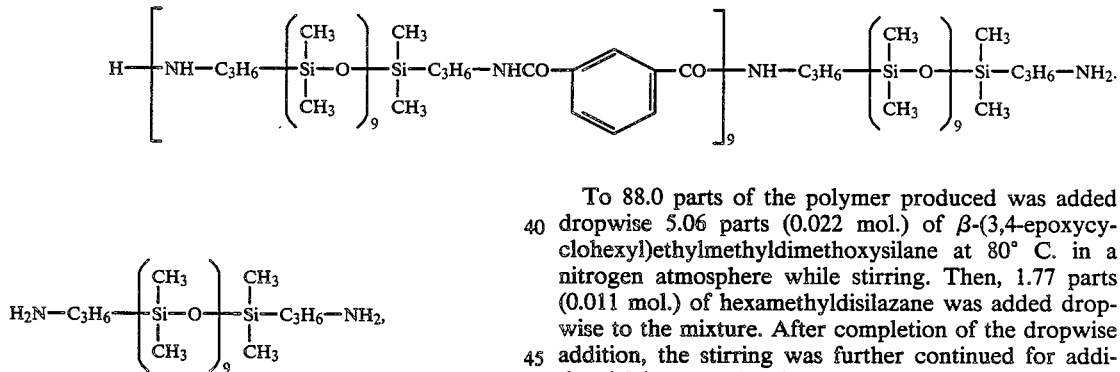

To 88.0 parts of the polymer produced was added dropwise 5.06 parts (0.022 mol.) of β-(3,4-epoxycyclohexyl)ethylmethyldimethoxysilane at 80° C. in a nitrogen atmosphere while stirring. Then, 1.77 parts (0.011 mol.) of hexamethyldisilazane was added dropwise to the mixture. After completion of the dropwise addition, the stirring was further continued for additional 2 hours under the same condition to effect reaction. After completion of the reaction, the excess silane and silazane, etc. were removed at 80° C. under reduced pressure to obtain a pale yellow transparent product. This product was identified as the expected siloxane-amide block copolymer represented by formula shown below by its infrared absorption spectrum:

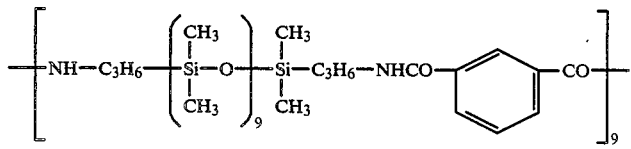

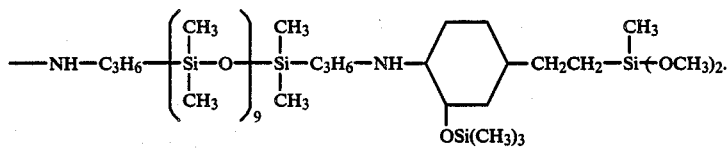

The copolymer had a thermal decomposition temperature of 360° C., proving satisfactorily resistant to heat. Other characteristic properties of the resulting copolymer are shown in Table 1 below.

EXAMPLE 3

To 384 parts of ion-exchanged water were added 50.0 parts (0.092 mol.) of diaminopropylsiloxane having formula:

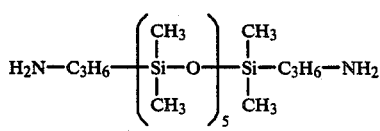

and 16.3 parts of anhydrous sodium carbonate, followed by stirring to mix. Then, 15.6 parts (0.077 mol.) of terephthalic dichloride was dissolved in 123.2 parts of 1,2-dichloroethane, and the resulting solution was added dropwise to the above-prepared mixture under stirring at room temperature. After the dropwise addition, the stirring was further continued at room temperature for 8 hours to effect polymerization. The resulting polymer was washed with water several times and dried under reduced pressure. The product was identified to be a siloxane-amide block copolymer represented by formula shown below by GPC, $^1$H-NMR spectrum and infrared absorption spectrum:

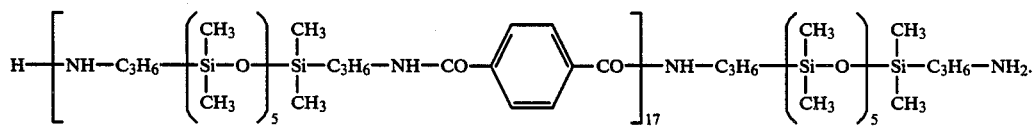

To 55.0 parts of the polymer produced was added 0.16 part of ammonium chloride. Then, 2.60 parts (0.011 mol.) of γ-glycidoxypropyltrimethoxysilane was added dropwise to the mixture while stirring in a nitrogen atmosphere. To the mixture was further added dropwise 0.81 part (0.005 mol.) of hexamethyldisilazane.

After completion of the dropwise addition, the stirring was further continued for additional 3 hours under the same condition to effect reaction. After completion of the reaction, the excess silane and silazane, etc. were removed at 100° C. under reduced pressure to obtain a pale yellow transparent product. This product was identified as the expected siloxane-amide block copolymer represented by formula shown below by its infrared absorption spectrum:

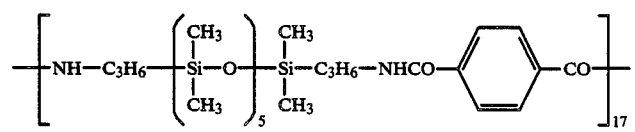

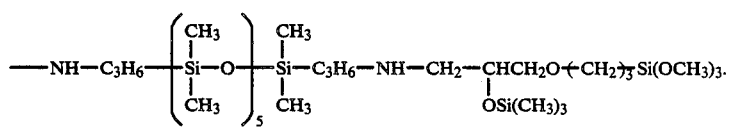

The copolymer had a thermal decomposition temperature of 395° C., proving satisfactorily resistant to heat. Other characteristics properties of the resulting copolymer are shown in Table 1 below.

TABLE 1

| Example No. | Yield (%) | Property | Processability (Mt. P.) | Reactive Curability |
|---|---|---|---|---|
| 1 | 93 | soft and resinous | good (80° C.) | hardened after aging at 20° C., 55% RH for 7 days* |
| 2 | 90 | liquid with very small fluidity | excellent (liquid) 7 days*** | hardened after aging at 20° C., 55% RH for |
| 3 | 95 | resinous | good (90° C.) | hardened after aging at 20° C., 55% RH for 7 days*** |

Note:
*Dibutyltin dilaurate (0.5 part/100 parts of the copolymer) was used in combination.
**Dibutyltin diacetate (0.3 part/100 parts of the copolymer) was used in combination.
***Dibutyltin oxide (0.2 part/100 parts of the copolymer) was used in combination.

While the invention has been described in detail and with reference to specific embodiments thereof, it will be apparent to one skilled in the art that various changes and modifications can be made therein without departing from the spirit and scope thereof.

What is claimed is:

1. A siloxane-amide block copolymer represented by formula (I):

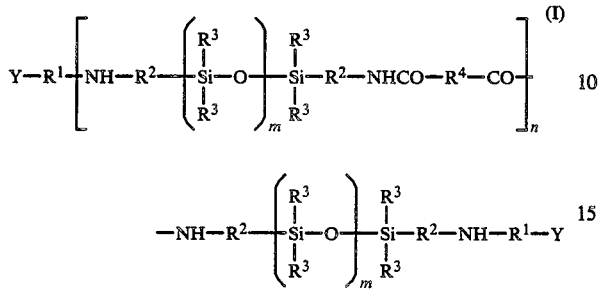

wherein Y represents an organosilyl group containing a hydrolyzable group represented by formula —SiR$^5_a$X$_{3-a}$; R$^1$ represents a divalent group selected form the group consisting of

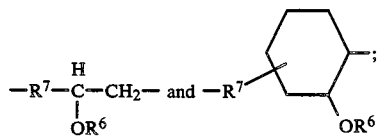

R$^2$ represents a substituted or unsubstituted divalent hydrocarbon group; R$^3$ represents a substituted or unsubstituted monovalent hydrocarbon group; R$^4$ represents a substituted or unsubstituted divalent aromatic hydrocarbon group; R$^5$ represents a substituted or unsubstituted monovalent hydrocarbon group; R$^6$ represents a hydrogen atom, the same substituted or unsubstituted monovalent hydrocarbon group as represented by R$^3$ or an organosilyl group represented by formula —SiR$^8_b$X$_{3-b}$; R$^7$ represents a substituted or unsubstituted divalent hydrocarbon group containing up to 8 carbon atoms which may contain therein an ether linkage containing an oxygen or sulfur atom; R$^8$ represents the same monovalent group as represented by R$^3$; X represents a hydrolyzable group or hydroxyl group bonded to the silicon atom; a represents 0 or an integer of 1 or 2; b represents 0 or an integer of from 1 to 3; and m and n each represents a number of 1 or more.

2. A siloxane-amide block copolymer as claimed in claim 1, wherein

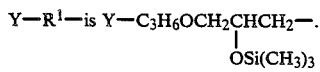

3. A siloxane-amide block copolymer as claimed in claim 1, wherein Y—R$^1$— is

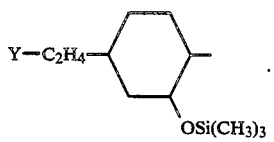

4. A process for producing a siloxane-amide block copolymer represented by formula (I):

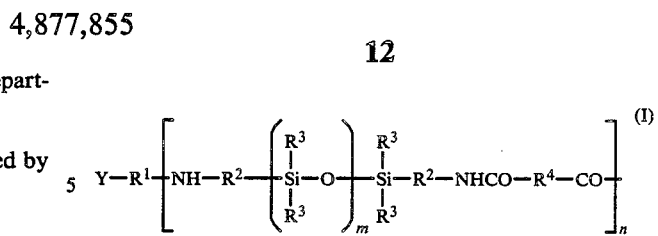

wherein Y represents an organosilyl group containing a hydrolyzable group represented by formula —SiR$^5_a$X$_{3-a}$; R$^1$ represents a divalent group selected from the group consisting of

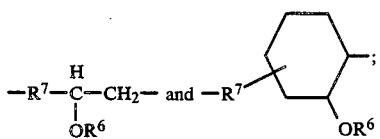

R$^2$ represents a substituted or unsubstituted divalent hydrocarbon group; R$^3$ represents a substituted or unsubstituted monovalent hydrocarbon group; R$^4$ represents a substituted or unsubstituted divalent aromatic hydrocarbon group; R$^5$ represents a substituted or unsubstituted monovalent hydrocarbon group; R$^6$ represents a hydrogen atom, the same substituted or unsubstituted monovalent hydrocarbon group as represented by R$^3$ or an organosilyl group represented by formula —SiR$^8_b$X$_{3-b}$; R$^7$ represents a substituted or unsubstituted divalent hydrocarbon group containing up to 8 carbon atoms which may contain therein an ether linkage containing an oxygen or sulfur atom; R$^8$ represents the same monovalent group as represented by R$^3$; X represents a hydrolyzable group or hydroxyl group bonded to the silicon atom; a represents 0 or an integer of 1 or 2; b represents 0 or an integer of from 1 to 3; and m and n each represents a number of 1 or more, which comprises mixing a diaminosiloxane represented by formula (II):

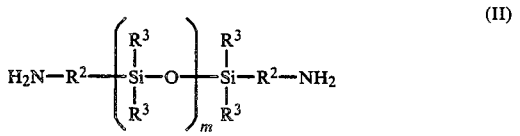

wherein R$^2$, R$^3$ and m are as defined above, and a dicarboxylic acid dihalide represented by formula (III) in an amount of from 1.005 to 2.0 mols of the diaminosiloxane per mol of the dicarboxylic acid dihalide:

wherein R$^4$ is as defined above; and Z represents a halogen atom, to form a polycondensate; and adding an epoxy silane represented by formula (IV) to said polycondensate:

wherein $R^5$, X, and a are as defined above; and $R^9$ represents an epoxy group-containing organic group represented by formula

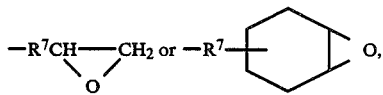

wherein $R^7$ is as defined above, to effect ring-opening addition to the both terminal groups of the polymer.

5. A process as claimed in claim 4, wherein said dicarboxylic acid dihalide is phthalic dichloride.

6. A process as claimed in claim 4, wherein said dicarboxylic acid dihalide is isophthalic dichloride.

* * * * *